(12) United States Patent
Singh et al.

(10) Patent No.: US 11,140,201 B2
(45) Date of Patent: Oct. 5, 2021

(54) SECURITY PLATFORM FOR MULTI-COMPONENT SYSTEM AND SERVICES THEREOF

(71) Applicant: International Business Machines Corporation, Armonk, NY (US)

(72) Inventors: Amandeep Singh, Dallas, TX (US); Mathews Thomas, Flower Mound, TX (US); Joel Viale, Vence (FR); Jacques Cresp, Saint Jeannet (FR); Fabrice Livigni, Nice Meridia (FR); Michael E. Alexander, Great Falls, VA (US); Vaibhav Jain, Boston, MA (US); Luca Marchi, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 16/279,007

(22) Filed: Feb. 19, 2019

(65) Prior Publication Data
US 2020/0267187 A1  Aug. 20, 2020

(51) Int. Cl.
| | |
|---|---|
| *H04L 29/06* | (2006.01) |
| *G06F 21/57* | (2013.01) |
| *G06F 21/54* | (2013.01) |
| *H04L 9/06* | (2006.01) |
| *H04L 9/32* | (2006.01) |

(52) U.S. Cl.
CPC .............. *H04L 63/20* (2013.01); *G06F 21/54* (2013.01); *G06F 21/57* (2013.01); *H04L 9/0637* (2013.01); *H04L 63/105* (2013.01); *H04L 9/3263* (2013.01); *H04L 2209/38* (2013.01)

(58) Field of Classification Search
CPC ..... H04L 63/20; H04L 9/0637; H04L 63/105; H04L 9/3263; H04L 2209/38; H04L 63/123; H04L 9/3239; G06F 21/57; G06F 21/54; G06F 21/64
See application file for complete search history.

(56) References Cited

U.S. PATENT DOCUMENTS

| | | | |
|---|---|---|---|
| 9,608,829 B2* | 3/2017 | Spanos | ................. H04L 9/3242 |
| 2020/0052903 A1* | 2/2020 | Lam | ...................... H04L 9/3218 |
| 2020/0266989 A1* | 8/2020 | Krcmaricic-Barackov | ................. H04W 12/06 |

* cited by examiner

*Primary Examiner* — Mahfuzur Rahman

(57) ABSTRACT

An example operation may include one or more of storing state information of a system component via a data block included among a hash-linked chain of data blocks of a blockchain, the state information identifying operating features of the system component at a first point in time, receiving, from the system component, re-computed state information of the system component captured at a second point in time that is subsequent to the first point in time, determining an integrity of the system component based on the re-computed state information and the previously stored state information of the system component stored among the hash-linked chain of data blocks, and transmitting information about the determined integrity to a computing system associated with the system component.

20 Claims, 19 Drawing Sheets

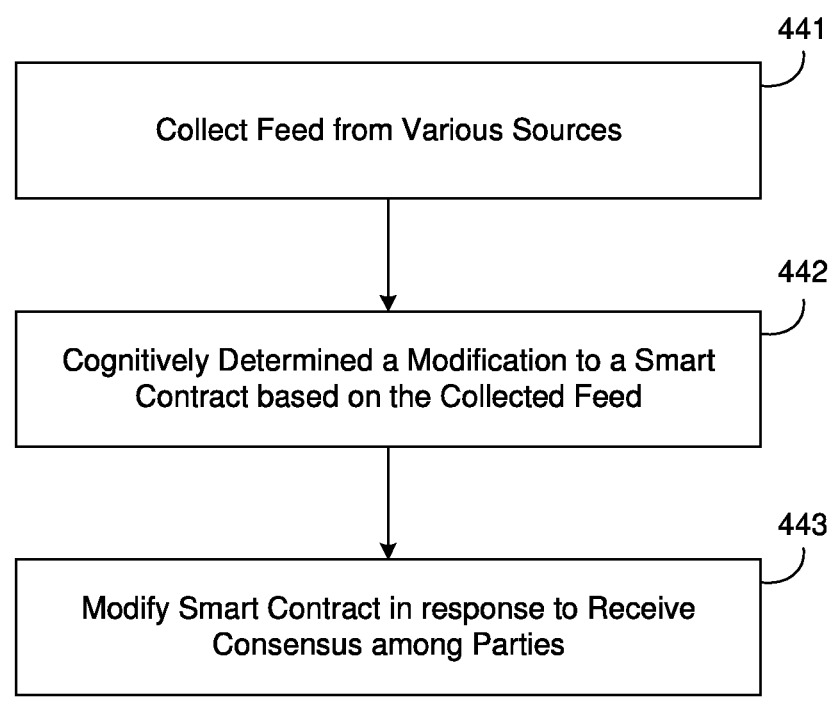

US 11,140,201 B2

SECURITY PLATFORM FOR MULTI-COMPONENT SYSTEM AND SERVICES THEREOF

TECHNICAL FIELD

This application generally relates to a security process, and more particularly, to a security platform which can ensure the integrity of both hardware components and software components of a system through the use of blockchain.

BACKGROUND

A centralized database stores and maintains data in a single database (e.g., a database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Services that are composed of different physical components and software components can be difficult to secure because of the vast array of technologies associated therewith. For example, connected devices in an Internet-of-Things (IoT) network such as connected cars in automobile industry, devices in healthcare industry, equipment and smart meters in energy and utility industry, customer premise equipment in home and enterprise networks; e-wallets in banking, and supply chains in retail and telecommunication, and the like, all present varying levels of technology which have different vulnerabilities to attack. As such, what is needed is a solution that can secure these different technologies and provide security on a service-level rather than an individual device or component level.

SUMMARY

One example embodiment provides a system that includes one or more of a storage configured to store state information of a system component via a data block included among a hash-linked chain of data blocks of a blockchain, where the state information identifies features of the system component at a first point in time, a processor configured to one or more of receive, from the system component, re-computed state information of the system component captured at a second point in time that is subsequent to the first point in time, and determine an integrity of the system component based on the re-computed state information and the previously stored state information of the system component stored among the hash-linked chain of data blocks, and a network interface configured to transmit information about the determined integrity to a computing system associated with the system component.

Another example embodiment provides a method that includes one or more of storing state information of a system component via a data block included among a hash-linked chain of data blocks of a blockchain, the state information identifying operating features of the system component at a first point in time, receiving, from the system component, re-computed state information of the system component captured at a second point in time that is subsequent to the first point in time, determining an integrity of the system component based on the re-computed state information and the previously stored state information of the system component stored among the hash-linked chain of data blocks, and transmitting information about the determined integrity to a computing system associated with the system component.

A further example embodiment provides a non-transitory computer readable medium comprising instructions, that when read by a processor, cause the processor to perform one or more of storing state information of a system component via a data block included among a hash-linked chain of data blocks of a blockchain, the state information identifying operating features of the system component at a first point in time, receiving, from the system component, re-computed state information of the system component captured at a second point in time that is subsequent to the first point in time, determining an integrity of the system component based on the re-computed state information and the previously stored state information of the system component stored among the hash-linked chain of data blocks, and transmitting information about the determined integrity to a computing system associated with the system component.

BRIEF DESCRIPTION OF THE DRAWINGS

FIG. 4D is a diagram illustrating a process of cognitively modifying a blockchain smart contract, according to example embodiments.

DETAILED DESCRIPTION

Figure 1:
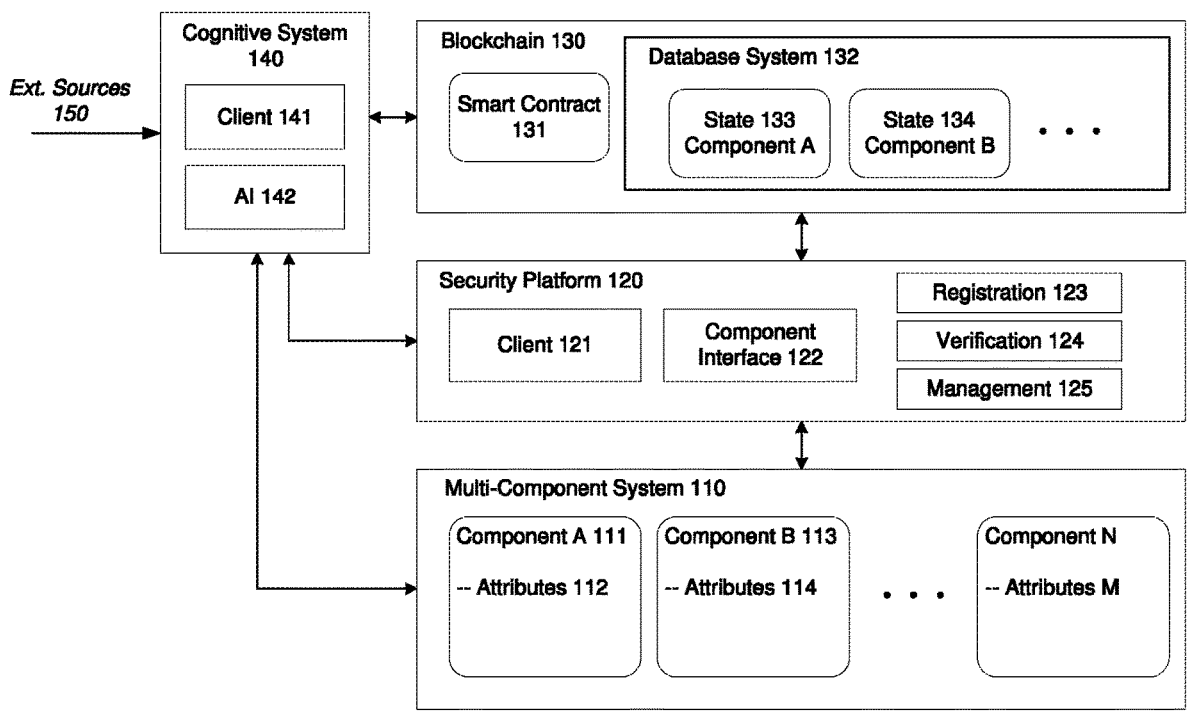
FIG. 1 is a diagram illustrating a computing environment for securing the integrity of a multi-component system, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which provide a security and integrity platform for a multi-component system and the services built thereon.

In one embodiment the system utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains often involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This system can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This system can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This system can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This system can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The security system described herein may improve the security and integrity of different types of components of a multi-component system (or service) as well as the services built on the individual components. The components can be physical, such as devices, equipment, software or virtual such as virtual network functions, containers, software applications, and the like which make up a multi-component system. The security system may create and compute a digital representation of a full state of a system component and conditions of the system component, and store the state information on the Blockchain for identity validation. Furthermore, the security system may use a smart contract to manage the rules for the registration, verification and management of this digital representation.

The digital representation of each component may be based on a combination of factors (which can include the list of running processes, installed packages, users logged in, authorized geofences locations, authorized memory or CPU range, etc.) which together provides a complete view of a state of a system component at a particular time and acts as a pre-authorized, valid state of the component. The use of the multiple factors creates a highly secured and protected identity within the environment. In some cases, the security ID can be at component or service level. Multiple components may create/implement a service. The representation could be an identification, a combination of identifications, or other artifacts. Blockchain is used to manage the security ID and artifacts related to the security ID.

Some benefits of the instant solutions described and depicted herein include improving the security and integrity of all the different physical, software and virtual components (devices, equipment, virtual network functions, containers, applications etc.) and services built on them. The security platform may manage the registration, verification and lifecycle of the component or service. It does so by providing various functionalities. For example, the security system may compute a digital representation (e.g., a crypto-identity) of a full state of a system component, using a multi-factor approach.

In addition, the security system may compute a digital representation of an entire multi-component system composed of the multiple components described above. A blockchain smart contract may maintain the status of the multi-component system based on the validity of the constituting components (e.g., certificates, security patches, operating system version levels, etc.) At any further time in the lifecycle of a component and/or the service, we can guarantee the security and integrity of each system component by re-computing the representation of that component at a new time and compare it to the one stored in the blockchain. A mechanism of challenge/response is used to avoid 'replay attacks'. For example, the component can be marked as 'non-compliant' if it moves outside the pre-defined geo location, if a new process is started or if a new package has been installed.

According to various embodiments, the security system may also manage the lifetime of the system component by managing who can modify the digital representation of the component in the blockchain, which changes can be made (update, delete, etc. . . . ), which factor(s) can be modified, and verifying that the change is valid and recorded upon the blockchain. For example, adding a new sensor or moving the component outside its predefined geo-location results in the generation of a new representation, based on smart contract details.

It is possible for the security system to be implemented without the use of a blockchain. In other words, the security system can be implemented on a traditional database. However, the security system would lose significant functionalities and advantages, that are provided by a blockchain. For example, the digital representations of components and services stored on the blockchain are immutable and cannot be hacked (tampered or altered without consensus). As a result, a malicious person or software cannot change the representation, making it more difficult to hack the device or service than in a traditional database. The digital representation is initially stored and managed through consensus among all the peer nodes in the blockchain. In an example, it could be the device manufacturer, the service provider, the customer, the installation agent, the system integrator, or other parties. Therefore, in contrast to a traditional database, no one party alone can manage (change or alter) the representation without the agreement of all the other parties.

In some embodiments, each peer node may share the same view thanks to the shared replicated ledger. As a result, there is only one version of the truth, which no one peer can modify on its own without consensus. Furthermore, a smart contract can be used to manage the rules defining what is the agreed conditions for a component or service to operate, for example, a certain geofence location, a range of temperature, a list of authorized software or processes, and the like. In contrast, a traditional database does not have such smart contracts. The smart contract and the access control mechanism in the blockchain also permit to easily control the permissions on who is authorized to register, update or delete the representations in the blockchain.

FIG. 1 illustrates a computing environment 100 for securing the integrity of a multi-component system, according to example embodiments. Referring to FIG. 1, the computing environment 100 includes a multi-component system 110 which may also be referred to as a multi-component service. The multi-component system is made up of multiple components 111, 113, and the like, which can include different types such as hardware components (devices, systems, etc.), software components (software applications, etc.), virtual components (virtual network functions, etc.), and the like. Each component may include various attributes 112 and 114, respectively, (also referred to as factors) which represent a state of the component.

The computing environment 100 further includes a security platform 120 which ensures the security and integrity of the components 111, 113, etc., of the multi-component system 110. According to various embodiments, the security platform 120 may request a digital representation from each of the components (e.g., during an initial connection with the multi-component system 110) and store the digital representations via data blocks included in a blockchain 130 which includes a database system 132 for storing the blocks. Here, a block may include state information 133 corresponding to a digital representation of component 111, and another block may include state information 134 corresponding to a digital representation of component 113, and the like. Furthermore, the security platform 120 can request a component of the multi-component system 110 to provide an update of current state thereof. In response, the component may recompute the state information and upload the state information to the security platform 120. In response, the security platform 120 can invoke the smart contract 130 to compare the recomputed state information to the previously recorded state information on the blockchain 130 to determine if the component is valid.

In various embodiments, the blockchain business model may define assets for service and components (physical, virtual, etc.) and different participants, service providers, equipment providers, software vendors, installation agencies, and the like. For example, the information of the components such as the digital representations which are created may be stored in data objects and the related participants may be mapped as owners and contributors. All the transactions generated by execution of specific functions may be stored as blocks on blockchain. The main attribute data may be stored in the metadata of transactions.

Computing a digital representation of a hardware component may be based on a multi-factor approach. First, the digital representation may be initially computed in a trusted environment (by a trusted human or a third-party trusted system). For instance, it can be done by the manufacturer, by the seller of physical device/equipment either before or during the installation and setup of the device in the end user environment, and the like. The digital representation may provide a complete view of the state of the hardware device ensuring and acting though as a pre-authorized, valid state of that device. For example, the digital representation may be a combination such as a set of string concatenation, a valid hashmap object representation of the device, or the like. Each hardware digital representation may include multiple attributes such as an operating system name of the hardware and exact level running on top of the device if applicable for the hardware asset, a firmware version if applicable for the hardware asset, an authorized memory or CPU range, a unique ID of the device (could be the IMEI for instance for a mobile phone, a serial number, etc.), and the like. For example, each device may be identified by a unique ID generated in most cases by the manufacturer itself.

In some embodiments, the digital representation of a hardware asset may include a model and hardware version if applicable for the hardware asset, MAC addresses of all network cards if any, IP addresses of all network cards config if any, a number and type of USB/Bluetooth/WiFi/wireless networks connected to the hardware asset, a list of system packages installed, a number of users/groups predefined, a number of failed password or login attempts, a number, name and type of cards (video cards, camera, sensor motion, . . . ) installed, a list of running processes or services, a list of active network ports opened, a list of patches and/or security patches installed, a list of script languages or compilers installed, and the like.

In addition to that non-exhaustive list above, the digital representation may include factors that are related to the device context such as, for example, authorized pre-defined geofences locations for the hardware asset, weather and or pressure conditions in an environment which includes the hardware asset, bandwidth available within the environment, and the like.

The use of those multiple factors creates a highly secured and protected identity of the system component within the environment. The combination of all the factors is then hashed by creating a keyed-hash string using encryption algorithms such as MD5, SHA1, SHA3, SHA224, SHA256, SHA384, SHA512, AES, DES, RC4, Rabbit, TripleDES, etc. The digital representation of the hardware component may be represented by a keyed-hash string and may be stored on the Blockchain 130 through the smart contract 131, over an encrypted communication channel, so that no one in the middle can view this hash.

As another example, a software component can be any computer program running on a server as either a container, a virtual machine, a traditional operating system, an application, or the like. In some embodiments, the multi-component system 110 may implement a service that is composed of a chain of software components. For each software component, when the service is started, the system may compute a digital hash of a multi-factor representation of the software component. This digital hash is the digital representation that is going to be used as a reference and stored in the blockchain 130 through the smart contract 131. The multi-factor representation for a software component may include and is not limited to, operating system information, OS version, OS Kernel version, CPU information, system architecture, a list of running processes and characteristics of each process, a list of files and characteristics of each file (creation date, modification date, etc.), a list of installed packages and characteristics of each package, content of configuration files, disk information, and the like. On a regular period of time, the system may compute the current digital hash of this multi-factor representation of the software asset. Each service transaction sent to the blockchain 130 will include this current digital hash that can be compared to the reference through a smart contract 131.

In the example of FIG. 1, the security platform 120 includes client 121 for interacting with the smart contract 131 on the blockchain 130. The security platform 120 also includes a component interface 122 which can be used to communicate with the different components of the multi-component system 110. The security platform 120 also includes a registration module 123, a verification module 124, and a management module 125. The registration module 123 may capture and register a new service as an asset (digital representation) on the blockchain 130. Each service will have a unique identifier, owners and contributors and set of component assets mapped to it. The registration module 123 may register new physical or virtual components as assets on the blockchain 130. A unique identifier is created for each component and owners and contributors are assigned. These components are also mapped to a service asset that is using these components. The registration module 123 may capture the activation of physical and virtual components with recording of the digital representation of the crypto-identity computed based on the full state of a component. The registration module 123 may manage a change in ownership of the individual components and service assets.

The verification module 124 may perform authentication, verification and integrity check on the physical and virtual components in the multi-component system 110 using digital representation information of the components stored on the blockchain 130. For physical components an authorization and integrity check is made every time the device accesses the network based on the latest configuration and comparing it to the registered one to the blockchain asset. A violation is recorded against the physical asset and service asset if check is not passed. For software components any violations for integrity and policies are recorded against blockchain assets, software component and service. In addition to the above violation checks, the verification module 124 may also trigger additional events based on SLA rules for these components and services.

The management module 125 may capture all the events for physical and software components, mapping them to the related service. With this, a provenance of all the updates and events corresponding to a component asset and the related service asset, is maintained in the blockchain 130. This also enables trigger of additional SLA smart contract actions based on an event.

In some embodiments, the environment 100 may also include a cognitive feedback system 140 which includes a client 141 for interacting with the smart contract 131. The cognitive system 140 may also include an artificial intelligence (AI) module 142 which collects a feed from the running services and components, security platform 120, and from other miscellaneous sources 150 such as agreement documents, Original Equipment Manufacturer (OEM's) documents, weather feeds, and feeds from social media. With this, the AI module 142 may determine the effectiveness of existing policies and rules enforced by the smart contract 131 of the blockchain 130 and provide feedback to the smart contract 131 to adjust accordingly.

In some embodiments, the AI module 142 may determine an effectiveness of the smart contract which includes collecting information from various external sources 150 and evaluating the effectiveness of the smart contract 131. Patterns may be identified and as patterns change the smart contract 131 will need to be changed. Existing deep learning models can write simple contracts but this will only improve with time where the system could update or create new contracts based on the cognitive analysis described above. The cognitive system 140 closes the loop as it provides cognitive/self-learning capabilities to the smart-contract which can then be updated accordingly via an admin node and adhering to the consensus model. This also enable predictions of an intelligent on-boarding of new participants adding new nodes and updating the smart-contract.

Figure 2A:
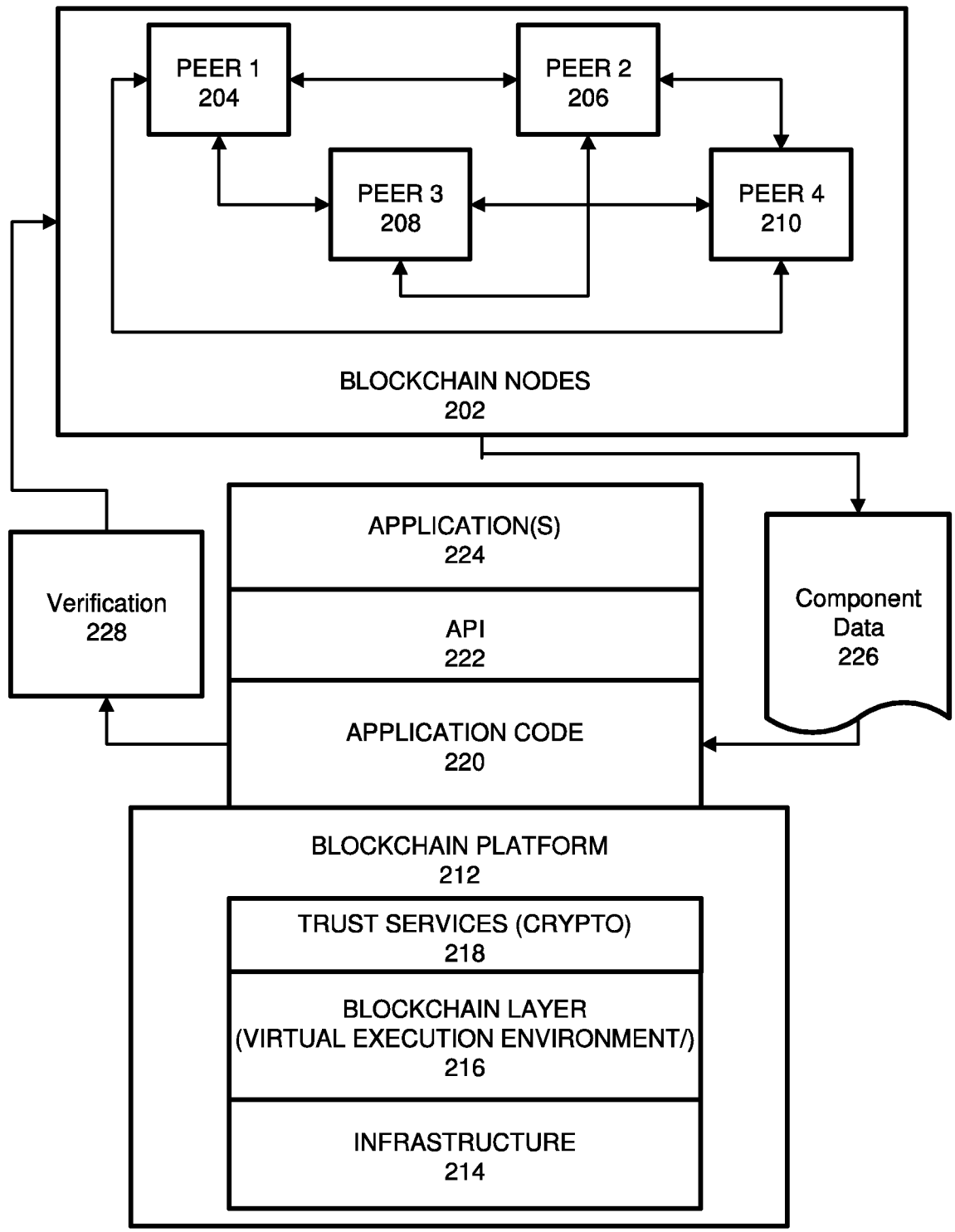
FIG. 2A is a diagram illustrating an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, component data 226 of a system component which may be processed by one or more processing entities (e.g., virtual machines) included in the blockchain layer 216. The result may include verification 228 of the system component based on an initial state information of the system component stored on the blockchain. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The execution of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
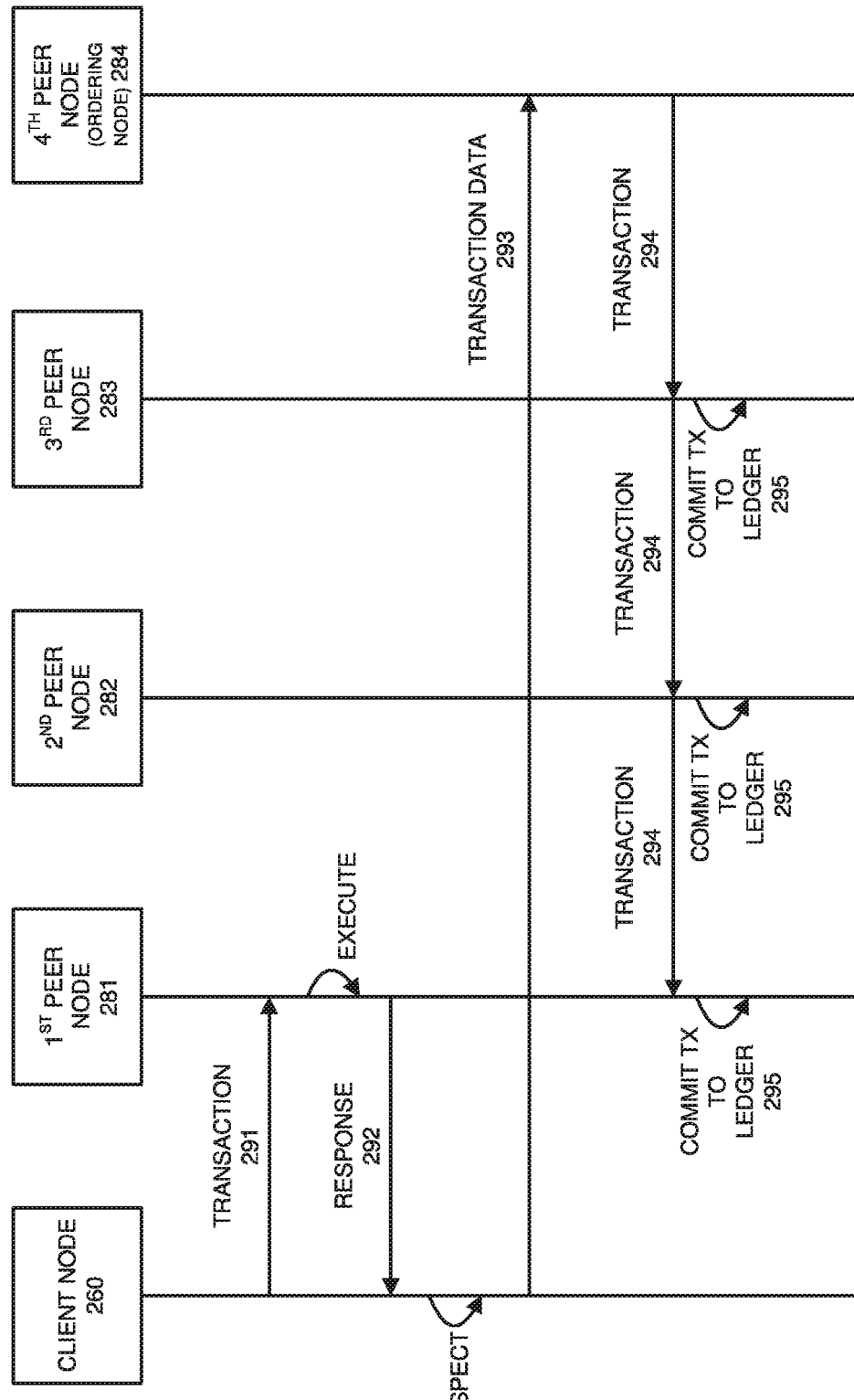
FIG. 2B is a diagram illustrating a blockchain transactional flow, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to the ledger state for read set variables since the read set variables was generated by the transaction execution. Transactions in the block are tagged as being valid or invalid. Furthermore, in step 295 each peer node 281-283 appends the block to the channel's chain, and for each valid transaction the write sets variables are committed to the current state database. An event is emitted, to notify the client application that the transaction (invocation) has been immutably appended to the chain, as well as to notify whether the transaction was validated or invalidated.

Figure 3A:
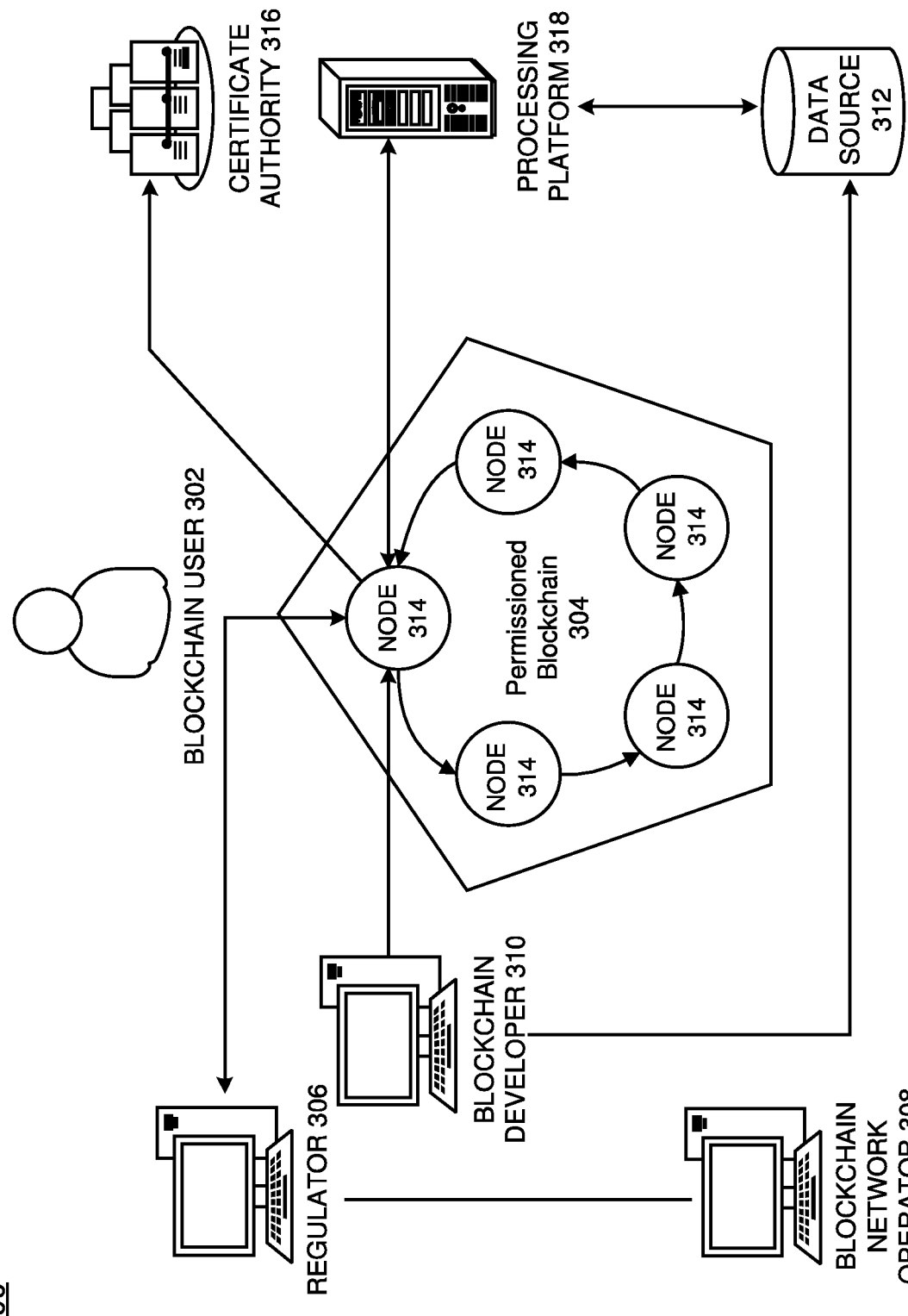
FIG. 3A is a diagram illustrating a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query operation and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
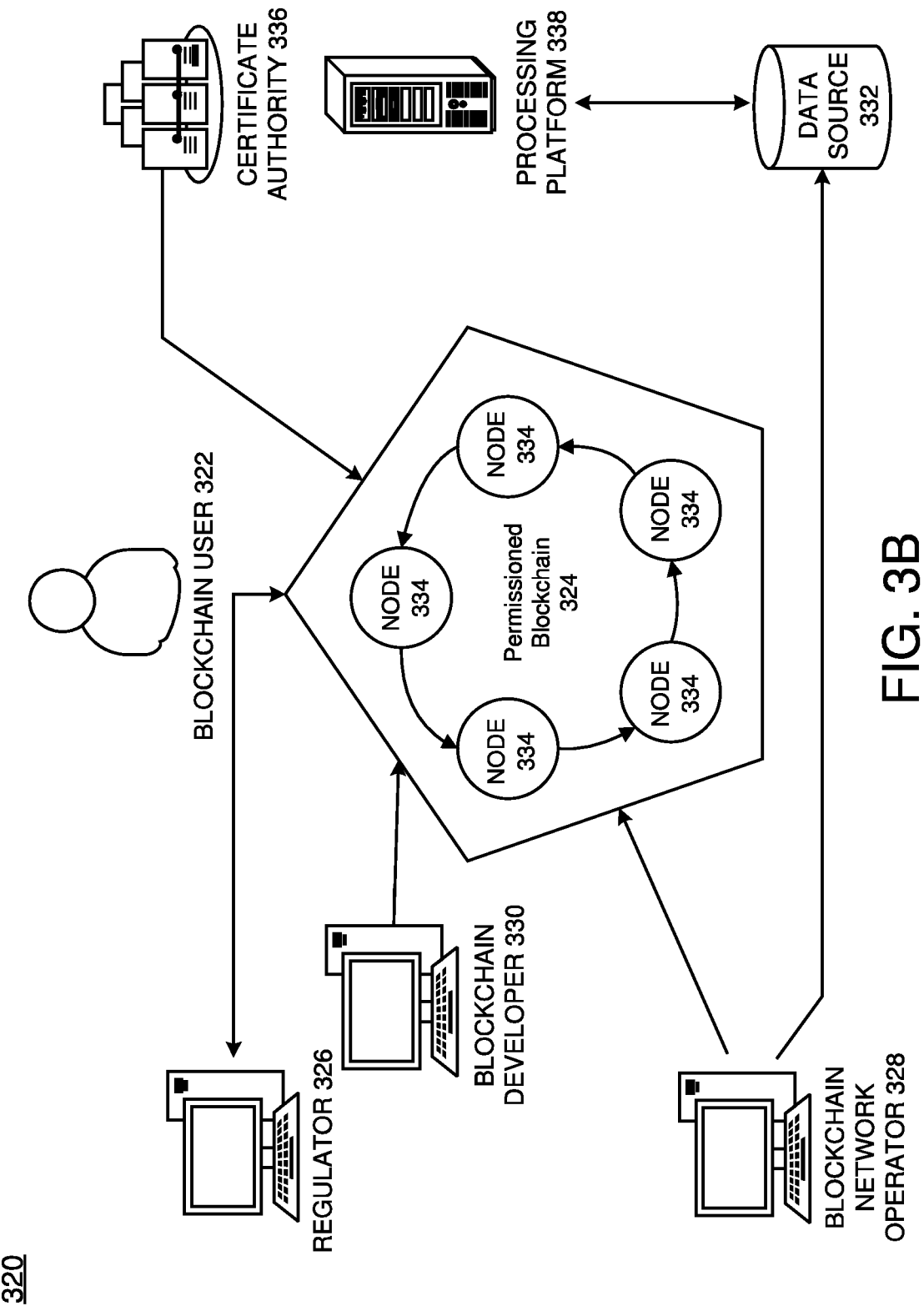
FIG. 3B is a diagram illustrating another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query operation and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

Figure 4A:
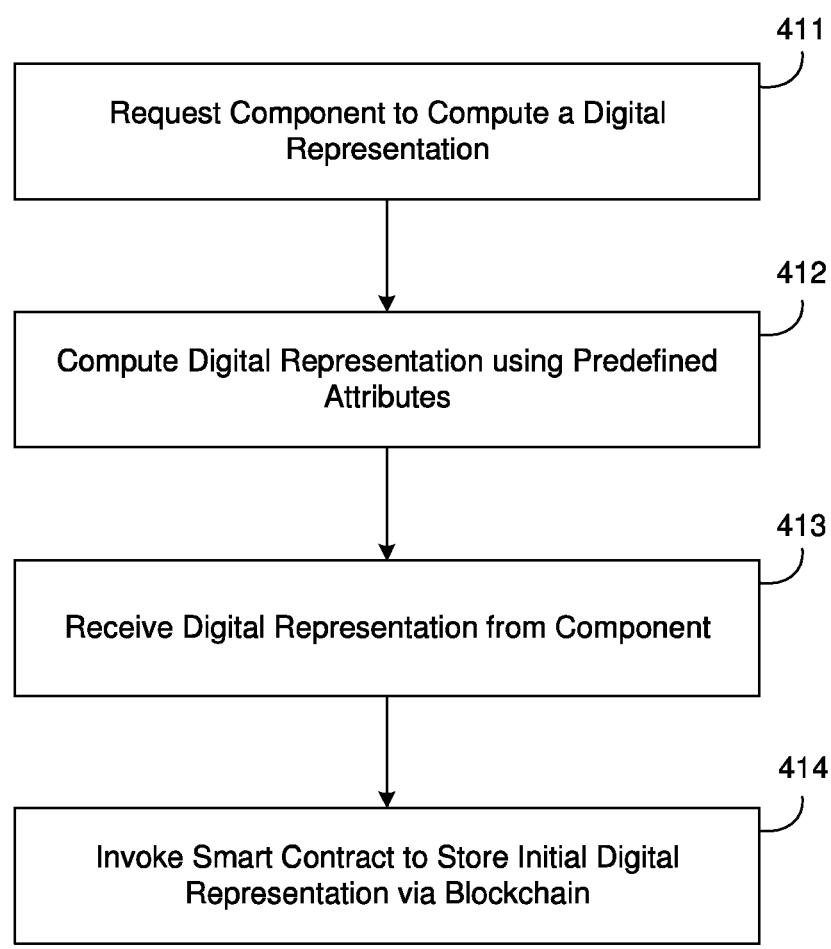
FIG. 4A is a diagram illustrating a process of registering a component via a blockchain, according to example embodiments.

FIG. 4A illustrates a process 410 of registering a system component via a blockchain, according to example embodiments. For example, the process 410 may be performed by the registration module 123 of the security platform 120 in FIG. 1. The process 410 may be performed during an initial connection of the system component to the security platform. Referring to FIG. 4A, in response to detecting the system component, in 411, the security platform requests a digital representation from the system component. In 412, the system component computes the digital representation based on pre-defined attributes for a type of the system component, and in 413, the digital representation is transmitted to and received by the security platform. In 414, the security platform invokes the blockchain smart contract to create a new data object with the system component digital representation and store the system component digital representation in the blockchain.

Figure 4B:
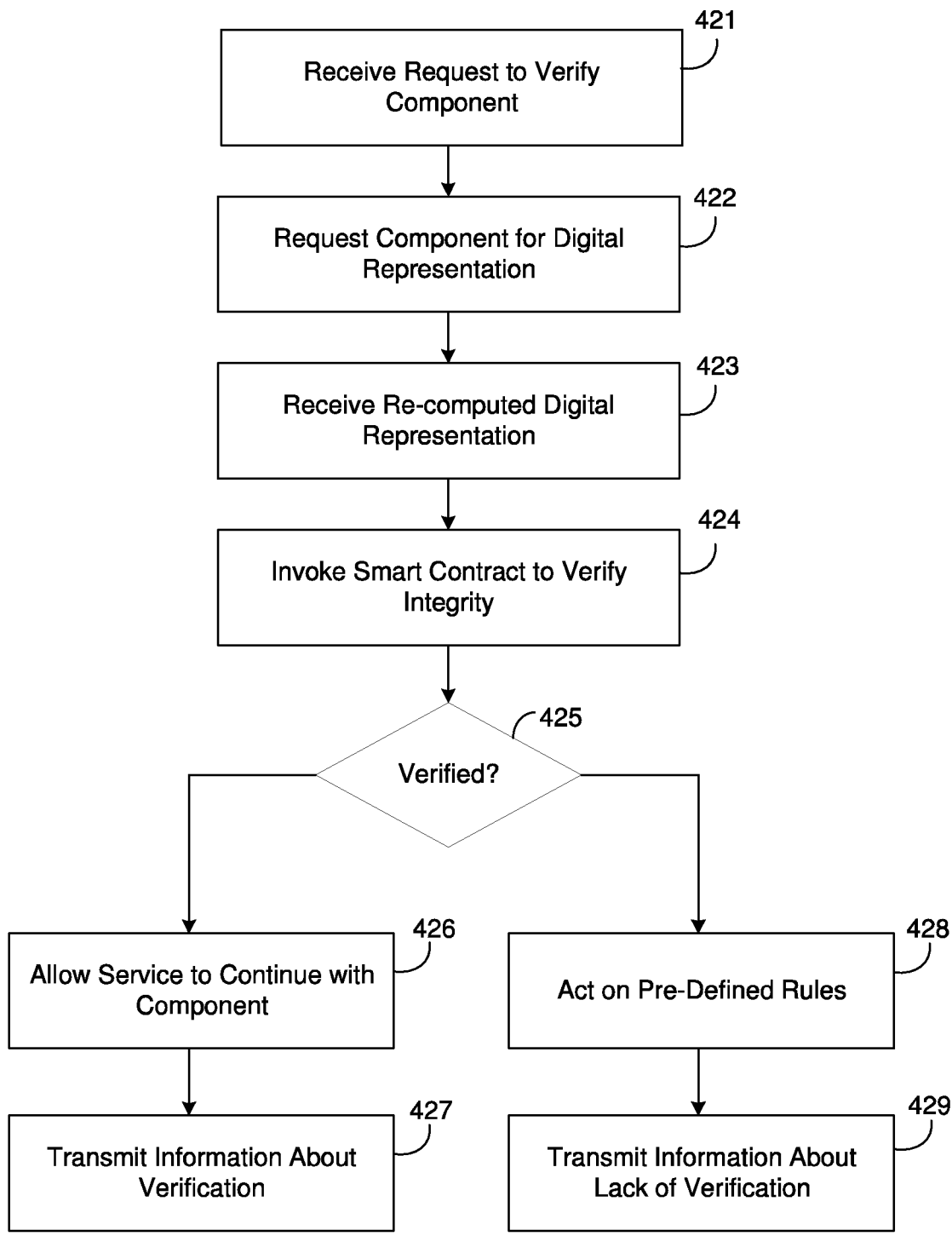
FIG. 4B is a diagram illustrating a process of verifying a registered component via a blockchain, according to example embodiments.

FIG. 4B illustrates a process 420 of verifying a registered component (or an entire multi-component system) via a blockchain, according to example embodiments. For example, the process 420 may be performed by the verification module 124 of the security platform 120 in FIG. 1. The verification process can be performed in response to a request from another entity, during a re-connection of a system component, periodically, randomly, or the like. In 421, the security platform receives a request to verify the multi-component system. In response, in 422 the security platform requests each component to re-compute its digital representation. In 423, each component re-computes its digital representation and forwards it to the security platform In 424, the security platform invokes the smart contract of the blockchain to verify whether the components of the multi-component system are valid based on the received recomputed digital representations of the components with respect to previously recorded digital representations of the components stored via the blockchain. In response to determining the components are valid in 425, the security platform enables the multi-component system to continue to operate and transmits information about the verification to the requesting entity such as a computing system. However, in response to determining at least one component is not valid in 425, the smart contract may send an alert, disable the multi-component system, or the like, in 428, based on predefined rules, and transmit information about the lack of verification to the requesting entity in 429.

Figure 4C:
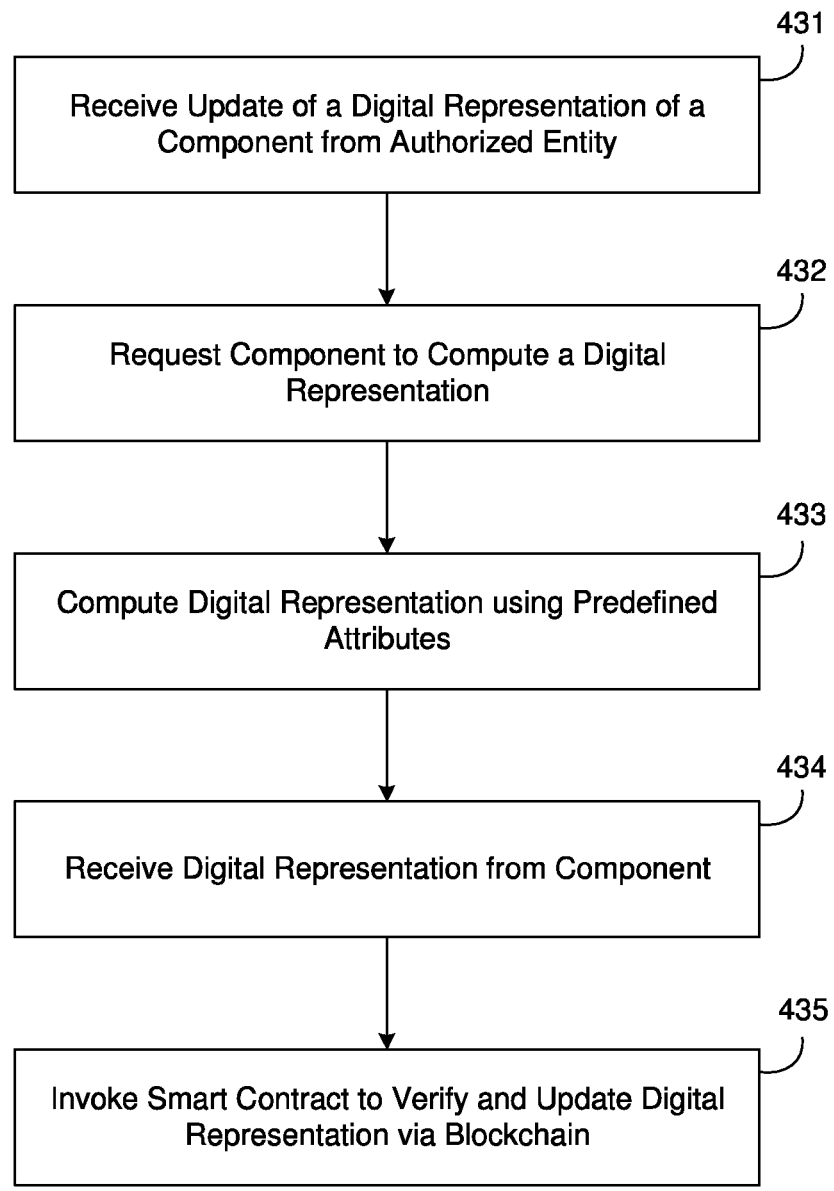
FIG. 4C is a diagram illustrating a process of updating a previously registered component via a blockchain, according to example embodiments.

FIG. 4C illustrates a process 430 of updating a previously registered component via a blockchain, according to example embodiments. For example, the process 430 may be performed by the management module 125 of the security platform 120 in FIG. 1. Referring to FIG. 4C, in 431, the security platform receives a request to update a digital representation of a system component previously recorded on the blockchain. In 432, the security platform requests the system component to recompute its digital representation, and in 433 the system component recomputes the digital representation based on pre-defined attributes for the type of system component. In 434, the security platform receives the recomputed digital representation and, in 435, the security platform verifies whether the digital representation is authentic based on the previously recorded digital representation with respect to the recomputed digital representation. If valid, the security platform may update the digital representation by storing the updated version on the blockchain.

FIG. 4D illustrates a process 440 of cognitively modifying a blockchain smart contract, according to example embodiments. For example, the process 440 may be performed by the cognitive feedback system 140 in FIG. 1. Referring to FIG. 4D, in 441, the cognitive system collects feedback from various sources including from the security platform, external sources, the system components, and the like. In 442, the cognitive system executes machine learning algorithms on the collected data to identify patterns/trends and to identify attributes of the system which are not optimal or otherwise can benefit from a change. In 443, the cognitive system instructs the smart contract on the blockchain to change one or more of a rule or policy associated with managing the system components of the multi-component system based on the analysis by the AI module.

Figure 5:
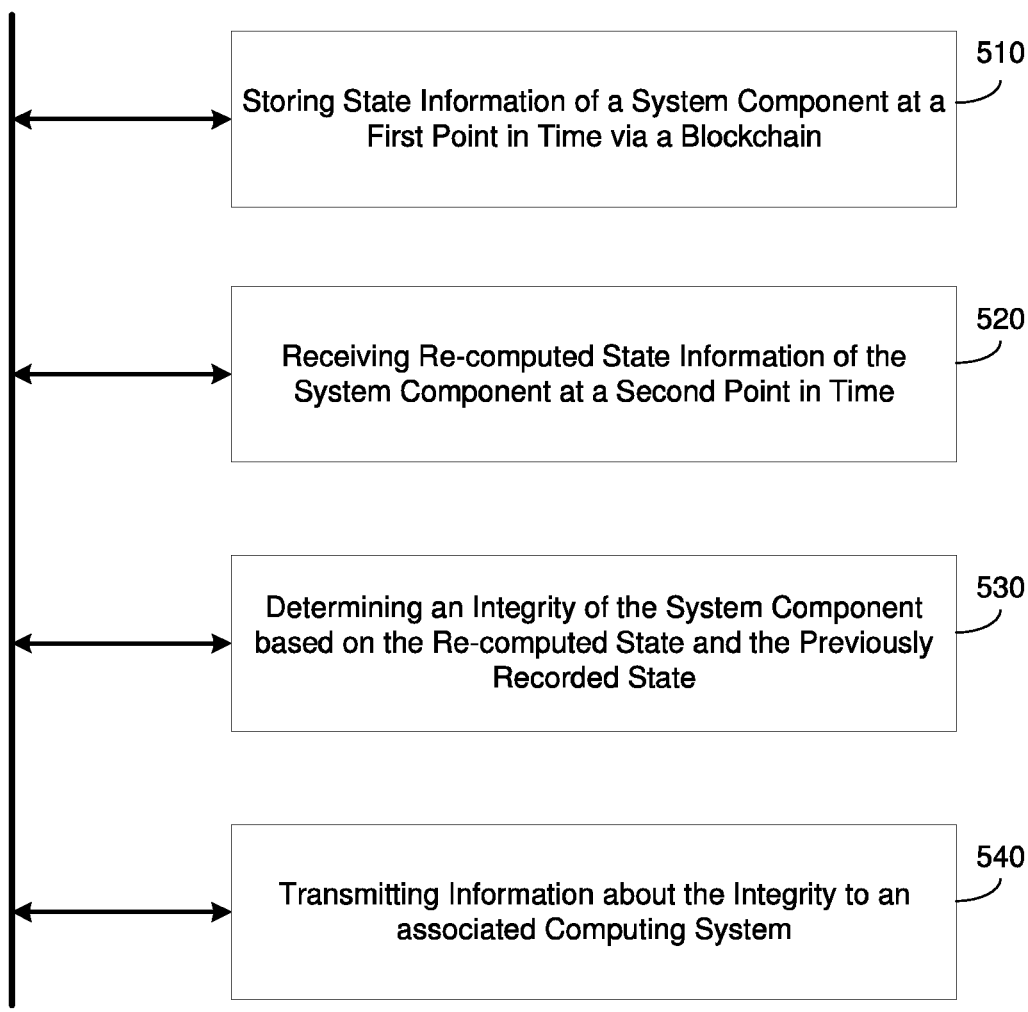
FIG. 5 is a flow diagram illustrating a method of verifying the security of a system component, according to example embodiments.

FIG. 5 illustrates a method 500 of verifying the security of a system component, according to example embodiments. For example, the method 500 may be performed by a host platform (e.g., a security platform) such as a server, a cloud platform, a user device, a group of devices, and the like. In 510, the method may include storing state information of a system component via a data block included among a hash-linked chain of data blocks of a blockchain, the state information identifying operating features of the system component at a first point in time. For example, the state information may include a digital representation of an asset (e.g., hardware device, virtual function, software application, etc.) which is included within a multi-component system. Each of the components of the multi-component system may store their digital representation therein to provide a complete via of the system.

According to various aspects, the system component may be any of a hardware component, a software component, a virtual component, and the like, which are included in a multi-component system having multiple types of components. In the example of a hardware component, and the state information may include a combination of hardware attributes including one or more of a network card address, processes running on the hardware component, model type, system packages installed, user information, active network ports, and wireless networks connected to the hardware component. In the example of a software component, the state information may include a combination of software attributes including one or more of operating system information, running processes, list of files, installed packages, and disk information. In the example of a virtual component, the state information may include a combination of attributes include one or more of a virtual element, a cloud provider, a customer ID, a location, a date and time of the last execution, notes, and the like.

In addition to storing factors/attributes of the individual components, the blockchain may also store state information of services built on the system components in the blockchain. In addition, the blockchain may also store attributes of the multi-component system that include state information of a combination of attributes including a service ID, a location, a creation timestamp, a list of hardware components, software components, and virtual components included in the multi-component system.

In 520, the method may include receiving, from the system component, re-computed state information of the system component captured at a second point in time that is subsequent to the first point in time. The re-computed state information may be requested by the security system in response to a re-connection of the system component, or some other event. As another example, the security system may periodically or randomly request re-computed state information of the system component.

In 530, the method may include determining an integrity of the system component based on the re-computed state information and the previously stored state information of the system component stored among the hash-linked chain of data blocks. For example, the security system may identify any changes to the state of the system component and determine if such changes are acceptable/authorized or if such changes are not authorized. In 540, the method may include transmitting information about the determined integrity to a computing system associated with the system component. For example, the transmitted information may include an alert/notification that the system component is authorized, not authorized, and the like.

Figure 6A:
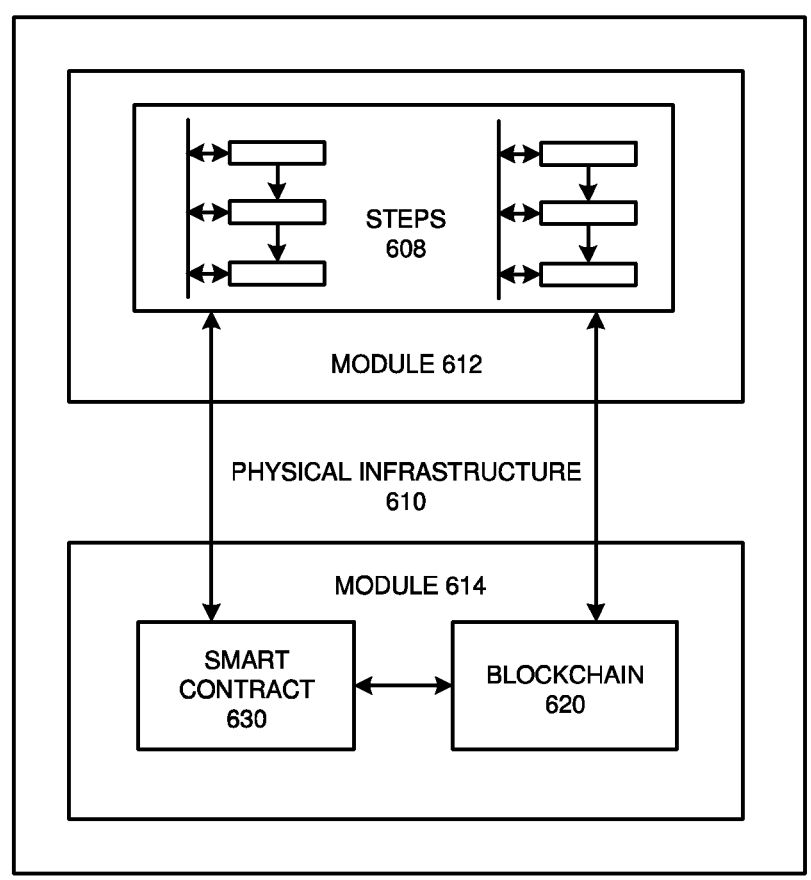
FIG. 6A is a diagram illustrating an example system configured to perform one or more operations described herein, according to example embodiments.

Although not shown in FIG. 5, the method may further include registering the system component and the state information of the system component with the blockchain in response to an initial connection of the system component. In response to the system component disconnecting from and re-connecting to the security system, the method may further include determining whether the system component is authorized to access a network shared with the security system based on a current state of the system component at a time of the re-connecting. In some embodiments, the method may further include receiving feedback from one or more of the system components and other components, cognitively determining a change associated with a state of the system component based on the received feedback, and implementing the change via the blockchain FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
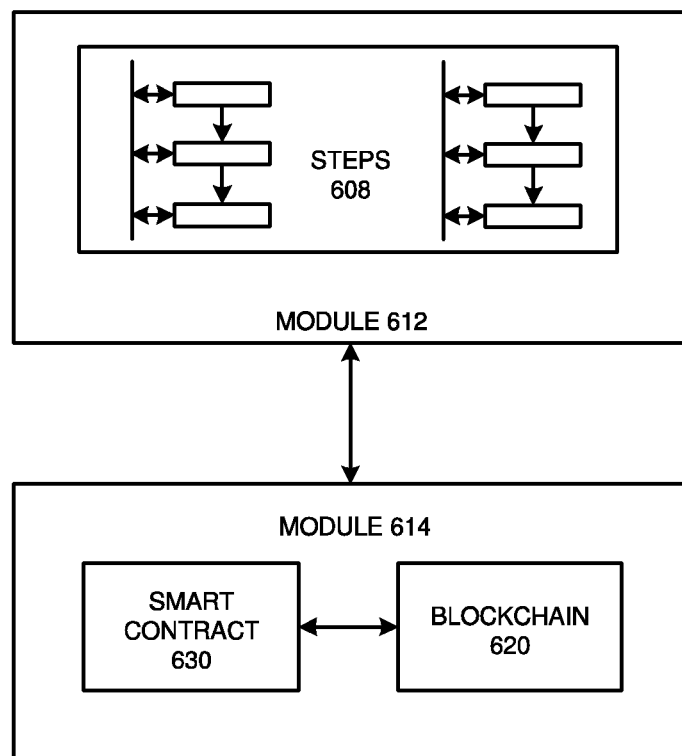
FIG. 6B is a diagram illustrating another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
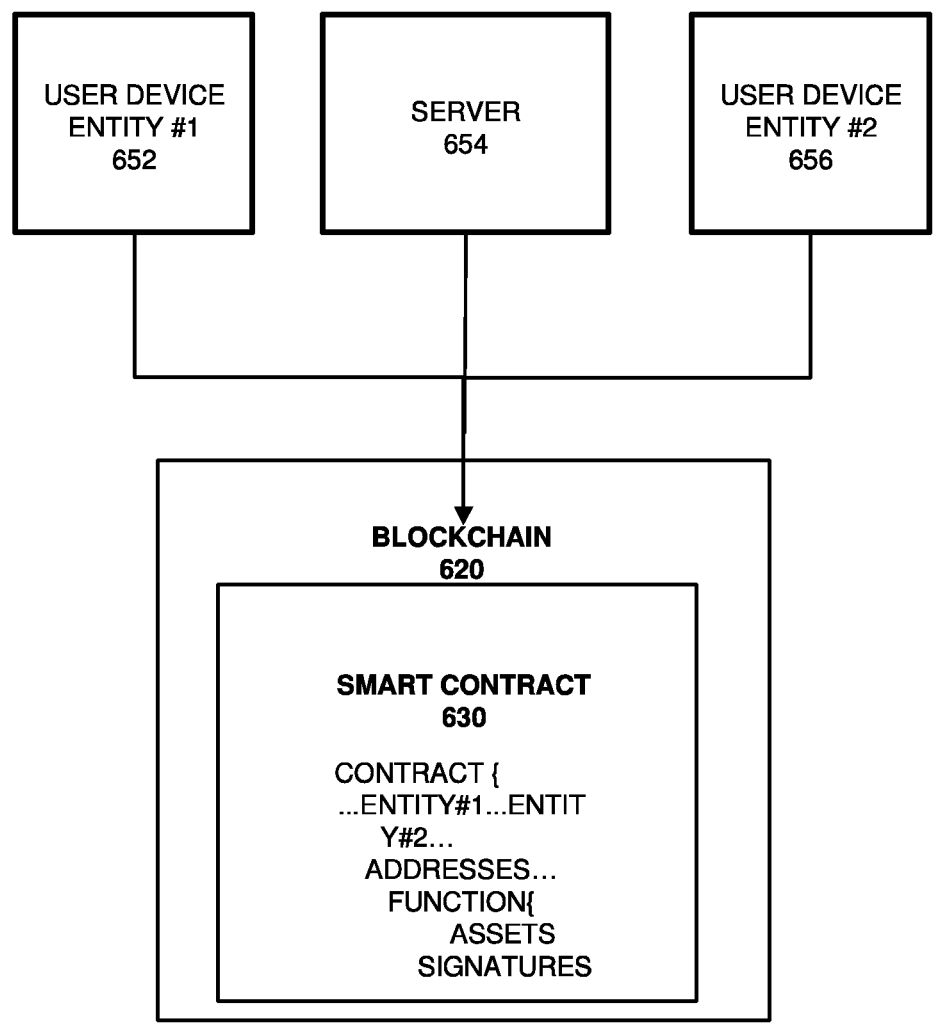
FIG. 6C is a diagram illustrating a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
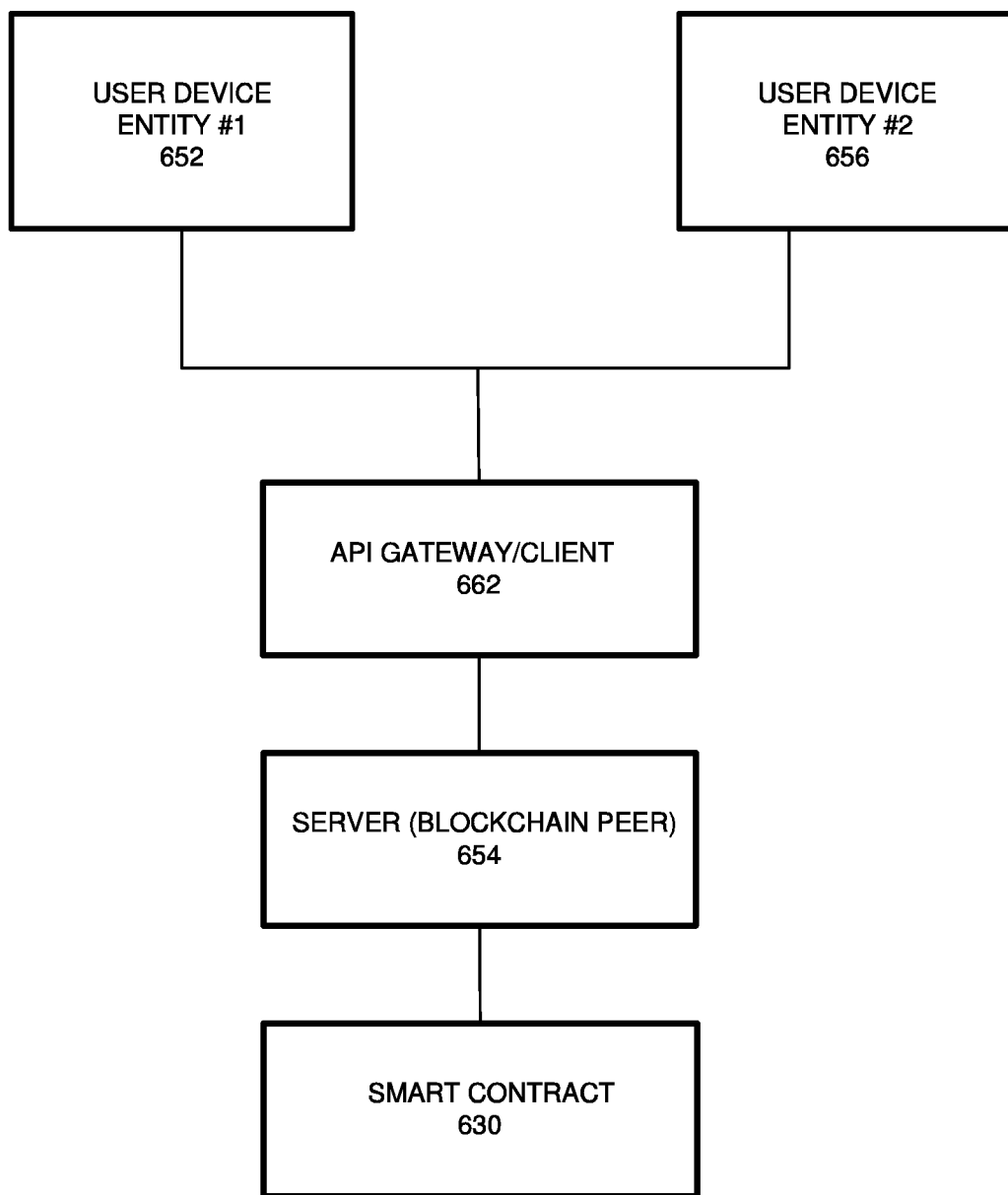
FIG. 6D is a diagram illustrating yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
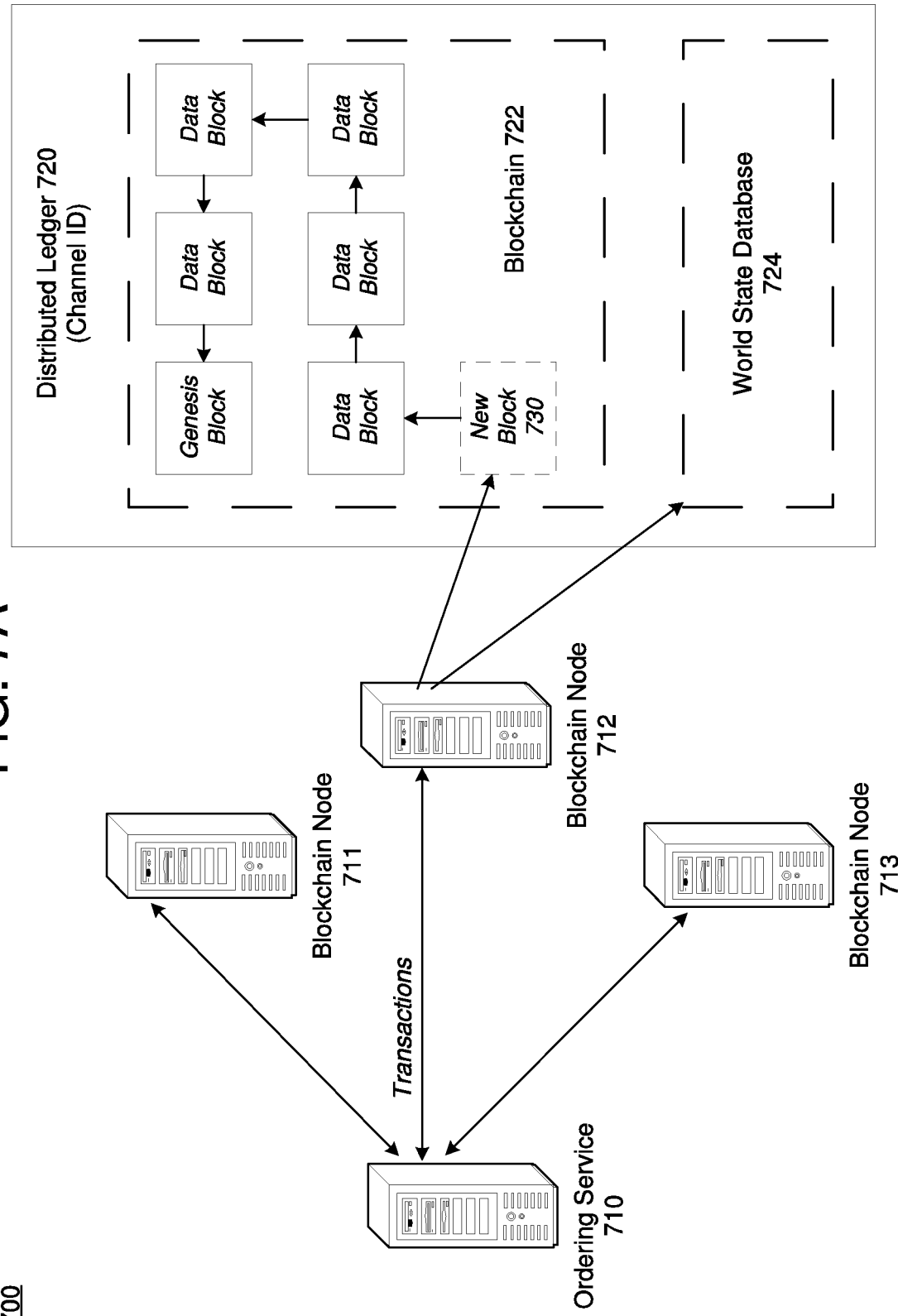
FIG. 7A is a diagram illustrating a process for a new block being added to a distributed ledger, according to example embodiments.
Figure 7B:
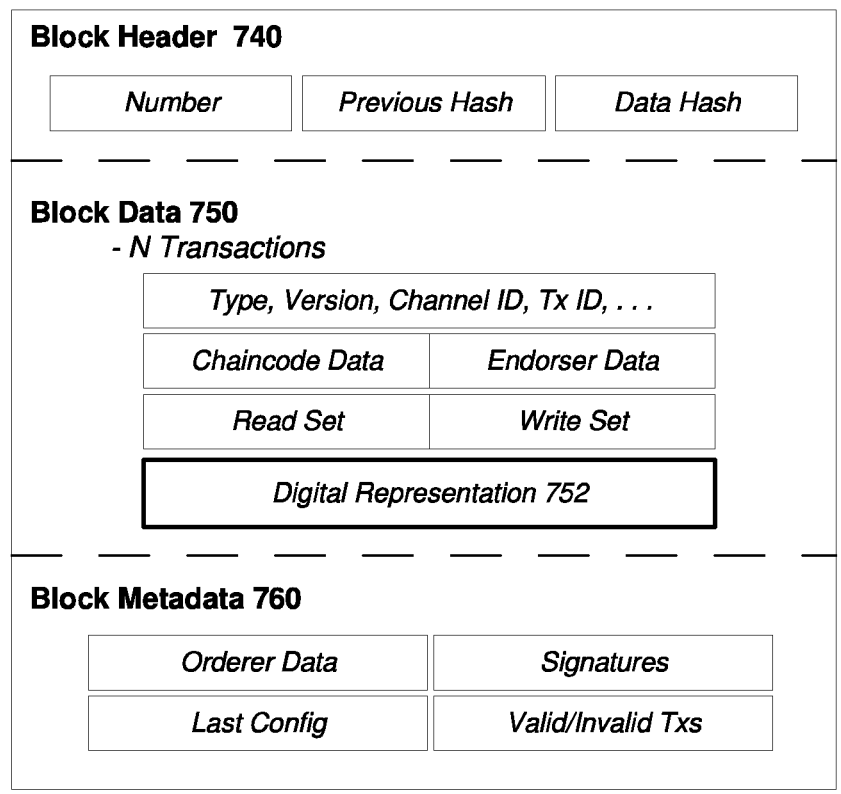
FIG. 7B is a diagram illustrating contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750, and block metadata 760. It should be appreciated that the various depicted blocks and their contents, such as new data block 730 and its contents. shown in FIG. 7B are merely examples and are not meant to limit the scope of the example embodiments. The new data block 730 may store transactional information of N transaction(s) (e.g., 1, 10, 100, 500, 1000, 2000, 3000, etc.) within the block data 750. The new data block 730 may also include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

The block data 750 may store transactional information of each transaction that is recorded within the new data block 730. For example, the transaction data may include one or more of a type of the transaction, a version, a timestamp, a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 750 may also store new data (digital representation 752) which adds additional information to the hash-linked chain of blocks in the blockchain 722. For example, the digital representation 752 may include a digital representation of a system component (hardware, software, virtual, etc.) including hardware features, services built thereon, and the like, which provide a complete view of each component in a multi-component system. Accordingly, the new data 752 can be stored in an immutable log of blocks on the distributed ledger 720. Some of the benefits of storing such new data 752 are reflected in the various embodiments disclosed and depicted herein and include improving the ability to secure an entire multi-component system at a service level rather than individually securing each component. Although in FIG. 7B the new data 752 is depicted in the block data 750, the digital representation 752 could also be located in the block header 740 or the block metadata 760.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the block data 750 and a validation code identifying whether a transaction was valid/invalid.

Figure 7C:
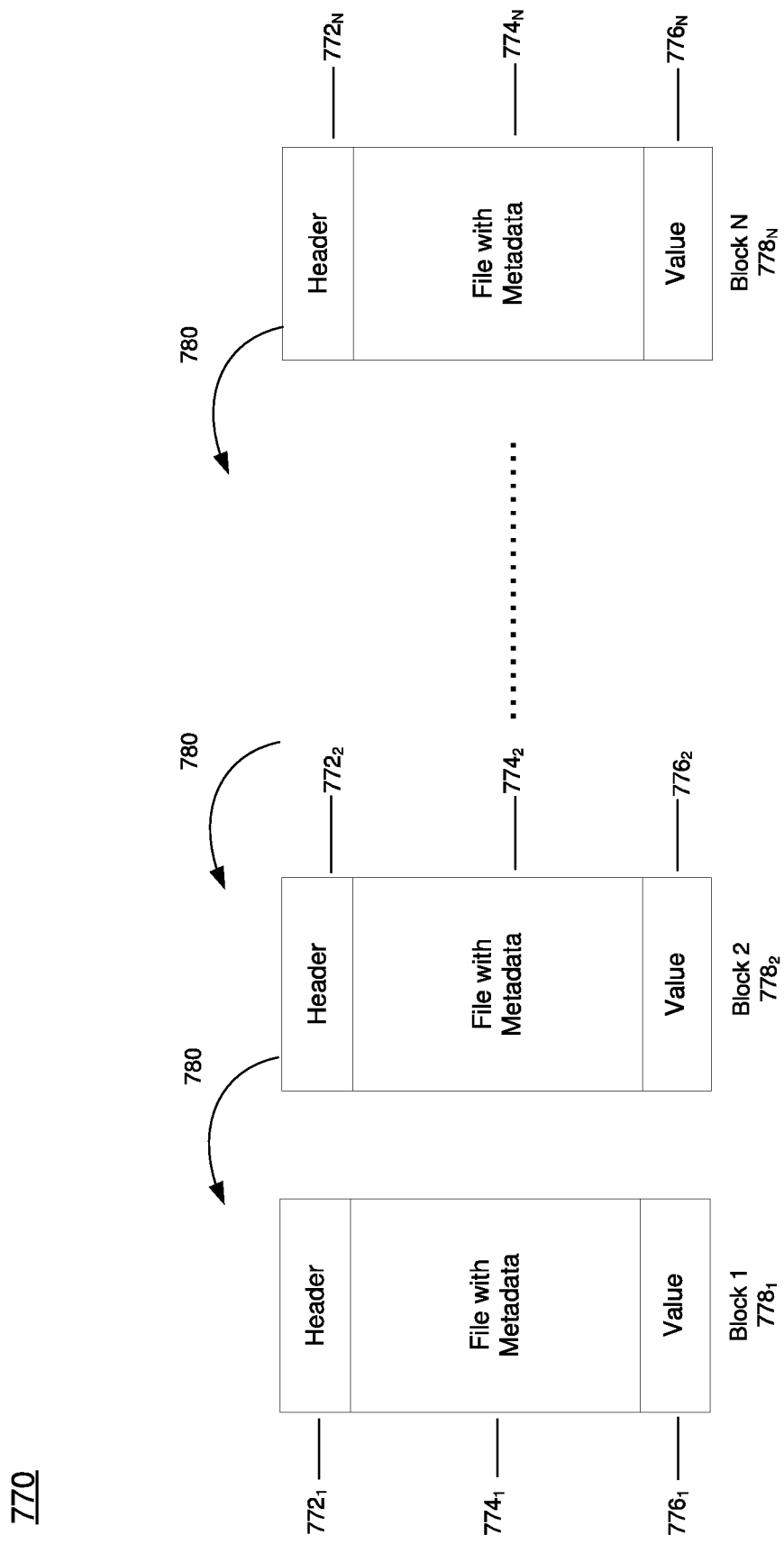
FIG. 7C is a diagram illustrating a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may not be included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that hash value in the storage area, which is stored in correspondence with the actual digital content. This operation may be performed, for example, by a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 7C, the blockchain 770 includes a number of blocks $778_1$, $778_2$, . . . $778_N$ cryptographically linked in an ordered sequence, where N≥1. The encryption used to link the blocks $778_1$, $778_2$, . . . $778_N$ may be any of a number of keyed or un-keyed Hash functions. In one embodiment, the blocks $778_1$, $778_2$, . . . $778_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, . . . , $778_N$ may be cryptographically linked by a function that is different from a hash function. For purposes of illustration, the following description is made with reference to a hash function, e.g., SHA-2.

Each of the blocks $778_1$, $778_2$, . . . , $778_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
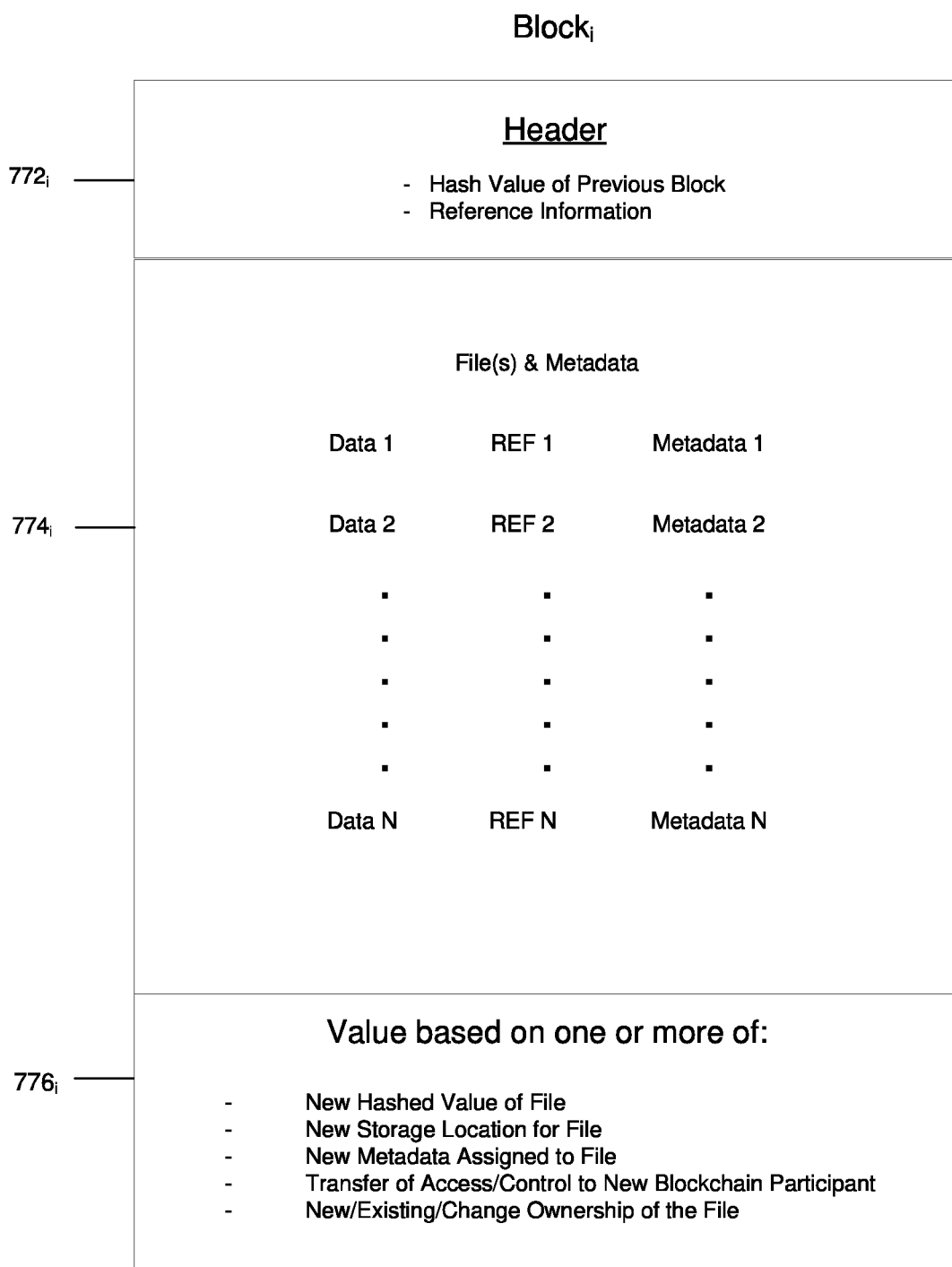
FIG. 7D is a diagram illustrating a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.
 a) new SHA-2 computed hash value if the file has been processed in any way (e.g., if the file was redacted, copied, altered, accessed, or some other action was taken)
 b) new storage location for the file
 c) new metadata identified associated with the file
 d) transfer of access or control of the file from one blockchain participant to another blockchain participant FIG. 7D illustrates an embodiment of a block which may represent the structure of the blocks in the blockchain 790 in accordance with one embodiment. The block, $Block_i$, includes a header $772_i$, a file $774_i$, and a value $776_i$.

The header $772_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $774_i$ includes a plurality of data, such as Data 1, Data 2, . . . , Data N in sequence. The data are tagged with metadata Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8:
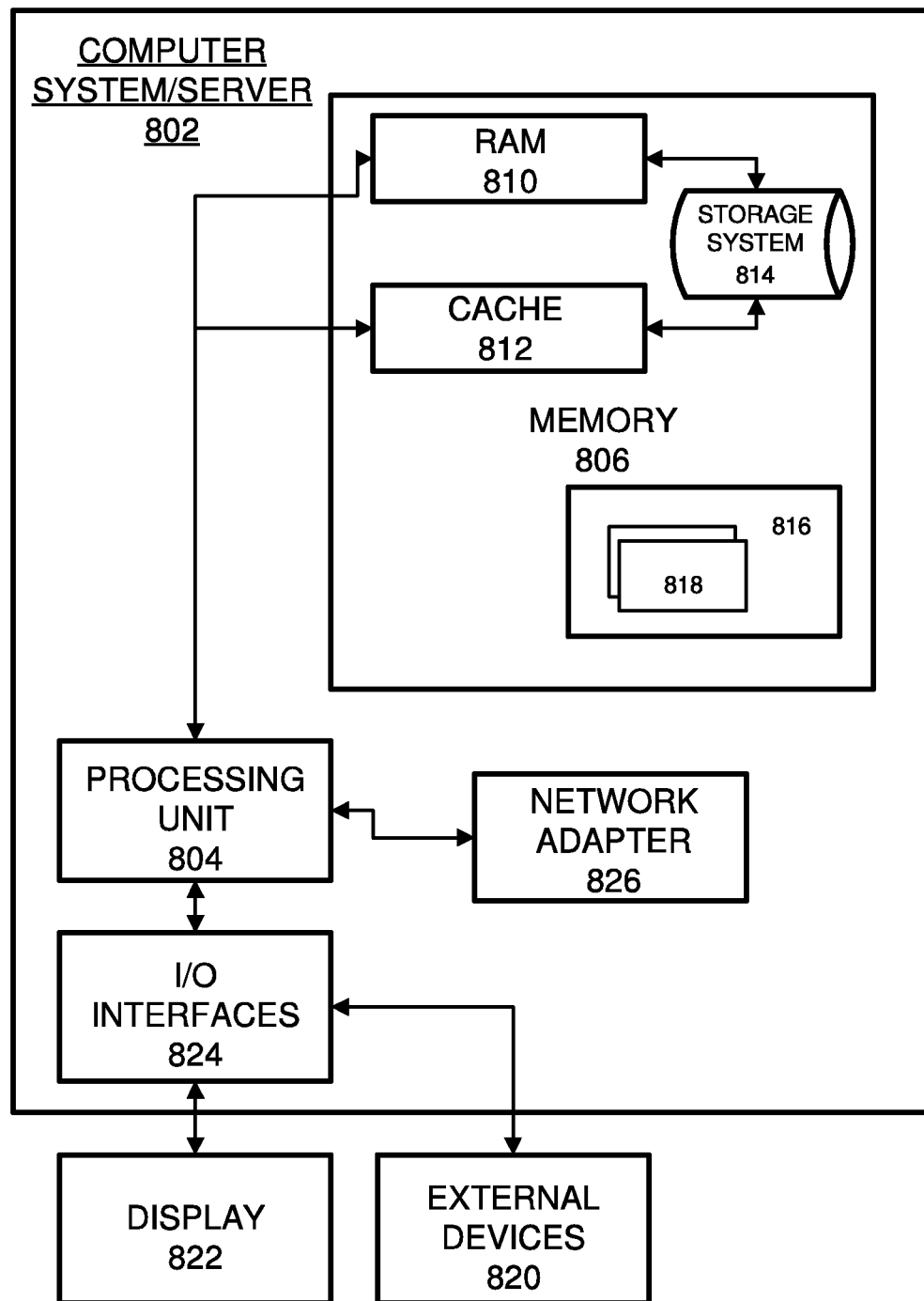
FIG. 8 is a diagram illustrating an example system that supports one or more of the example embodiments.

FIG. 8 illustrates an example system 800 that supports one or more of the example embodiments described and/or depicted herein. The system 800 comprises a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A security system comprising:
   a storage configured to store state information of a system component via a data block included among a hash-linked chain of data blocks of a blockchain, where the state information identifies features of the system component at a first point in time;
   a processor configured to receive, from the system component, re-computed state information of the system component captured at a second point in time that is subsequent to the first point in time, and determine that a digital representation of the system component is invalid based on the re-computed state information and the previously stored state information of the system component stored among the hash-linked chain of data blocks; and
   a network interface configured to transmit information about the determination to a computing system associated with the system component.

2. The security system of claim 1, wherein the system component is any of a hardware component, a software component, and a virtual component.

3. The security system of claim 1, wherein the system component comprises a hardware component, and the state information comprises a combination of hardware attributes which includes one or more of a network card address, processes on the hardware component, model type, system packages installed, user information, active network ports, and wireless networks connected to the hardware component.

4. The security system of claim 1, wherein the system component comprises a software component, and the state information comprises a combination of software attributes which include one or more of operating system information, processes associated therewith, a list of files, installed packages, and disk information.

5. The security system of claim 1, wherein the system component comprises a virtual component, and the state information comprises a combination of virtual attributes which include one or more of a virtual element identification, a cloud provider identification, and a geo-location.

6. The security system of claim 1, wherein the processor is further configured to store state information of services built on the system components in the blockchain, where the state information of the services comprises one or more of a service ID, a location, and a creation timestamp.

7. The security system of claim 1, wherein the processor is further configured to register the system component and the state information of the system component with the blockchain in response to an initial connection of the system component.

8. The security system of claim 1, wherein, in response a disconnection and a reconnection of the system component to the security system, the processor is further configured to determine whether the system component is authorized to access a network shared with the security system based on a current state of the system component.

9. The security system of claim 1, wherein the processor is further configured to receive feedback from one or more of the system components and other components, cognitively determine a change associated with the state of the digital representation of the system component based on the received feedback, and implement the change via the blockchain.

10. A method of a security system, comprising:
    storing state information of a system component via a data block included among a hash-linked chain of data blocks of a blockchain, the state information identifying operating features of the system component at a first point in time;
    receiving, from the system component, re-computed state information of the system component captured at a second point in time that is subsequent to the first point in time;
    determining that a digital representation of the system component is invalid based on the re-computed state information and the previously stored state information of the system component stored among the hash-linked chain of data blocks; and
    transmitting information about the determination to a computing system associated with the system component.

11. The method of claim 10, wherein the system component is any of a hardware component, a software component, and a virtual component.

12. The method of claim 10, wherein the system component comprises a hardware component, and the state information comprises a combination of hardware attributes including one or more of a network card address, processes running on the hardware component, model type, system packages installed, user information, active network ports, and wireless networks connected to the hardware component.

13. The method of claim 10, wherein the system component comprises a software component, and the state information comprises a combination of software attributes including one or more of operating system information, running processes, list of files, installed packages, and disk information.

14. The method of claim 10, wherein the system component comprises a virtual component, and the state information comprises a combination of virtual attributes which include one or more of a virtual element identification, a cloud provider identification, and a geo-location.

15. The method of claim 10, further comprising state information of services built on the system components in the blockchain, where the state information of the services comprises one or more of a service ID, a location, and a creation timestamp.

16. The method of claim 10, further comprising registering the system component and the state information of the system component with the blockchain in response to an initial connection of the system component.

17. The method of claim 10, further comprising, in response to the system component disconnecting from and re-connecting to the security system, determining whether the system component is authorized to access a network shared with the security system based on a current state of the system component at a time of the re-connecting.

18. The method of claim 10, further comprising receiving feedback from one or more of the system components and other components, cognitively determining a change associated with the state of the digital representation of the system component based on the received feedback, and implementing the change via the blockchain.

19. The non-transitory computer readable medium of claim 17, wherein the system component is any of a hardware component, a software component, and a virtual component.

20. A non-transitory computer readable medium comprising instructions that when read by a processor cause the processor to perform a method comprising:

storing state information of a system component via a data block included among a hash-linked chain of data blocks of a blockchain, the state information identifying operating features of the system component at a first point in time;

receiving, from the system component, re-computed state information of the system component captured at a second point in time that is subsequent to the first point in time;

determining that a digital representation of the system component is invalid based on the re-computed state information and the previously stored state information of the system component stored among the hash-linked chain of data blocks; and transmitting information about the determination to a computing system associated with the system component.

* * * * *